United States Patent [19]
SooHoo

[11] Patent Number: 5,175,737
[45] Date of Patent: Dec. 29, 1992

[54] CAVITY REFERENCED ACOUSTO-OPTICAL LASER FREQUENCY STABILIZATION

[75] Inventor: Kie L. SooHoo, Anaheim, Calif.

[73] Assignee: Rockwell International Corporation, Seal Beach, Calif.

[21] Appl. No.: 763,786

[22] Filed: Sep. 23, 1991

[51] Int. Cl.$^5$ .............................................. H01S 3/13
[52] U.S. Cl. ........................................ 372/32; 372/13; 372/18; 372/31
[58] Field of Search ...................... 372/94, 97, 18, 13, 372/32, 31; 356/350

[56] References Cited

U.S. PATENT DOCUMENTS

| | | | |
|---|---|---|---|
| 4,352,562 | 10/1982 | Minden | 356/350 |
| 4,707,061 | 11/1987 | McMahon | 372/18 |
| 4,807,999 | 2/1989 | SooHoo | |
| 4,815,851 | 3/1989 | SooHoo | |
| 4,830,495 | 5/1989 | SooHoo et al. | |
| 4,921,354 | 5/1990 | SooHoo | 372/94 |

Primary Examiner—Léon Scott, Jr.
Attorney, Agent, or Firm—H. Fredrick Hamann; George A. Montanye; Tom Streeter

[57] ABSTRACT

The CAVITY REFERENCED ACOUSTO-OPTICAL LASER FREQUENCY STABILIZATION shown here locks the frequency of a laser 10 to that of a reference cavity 26. It frequency modulates the input 24 to the cavity 26 with an acouto-optical modulator 18 which operates on a sample 16 extracted from the output beam 14 of the laser 10 rather than on the output beam 14 itself. The cavity 26 can be tuned to any convenient frequency, and the operator is not limited to any specific reference absorption material. Since dithering is done on the sample 16 rather than on the output 14, no contamination of spectral purity takes place.

6 Claims, 1 Drawing Sheet

CAVITY REFERENCED ACOUSTO-OPTICAL LASER FREQUENCY STABILIZATION

This invention was made with Government support under Contract No. F04704-86-C-0017 awarded by the Air Force. The Government has certain rights in this invention.

BACKGROUND OF THE INVENTION

A laser is often required which has its long term frequency stabilized to a high precision. One way to do this is to lock the frequency to an external source, such as the resonant absorption frequency of a gas through which the laser beam is directed. This is unsatisfactory for two reasons. First, the desired laser frequency may be different from that of the resonant frequency of any conveniently available reference material. Second, dithering the laser so as to induce changes in amplitude in the beam as it emerges from the reference material will itself contaminate the spectral purity of the laser by adding side bands to the frequency spectrum of the laser.

SUMMARY OF THE INVENTION

It is an objective of the present invention to overcome the limitations of the prior art by providing laser stabilization which neither is fixed to the resonant frequency of any reference material, nor is contaminated by any dither frequency.

It is a feature of the present invention that a sample is extracted from the emergent light, and that the sample, rather than the emergent light, is dithered by an AOM.

It is another feature of the present invention that the frequency is locked to the resonant frequency of a cavity resonator, rather than to the resonant frequency of a reference material.

DETAILED DESCRIPTION OF A PREFERRED EMBODIMENT

Figure 1:
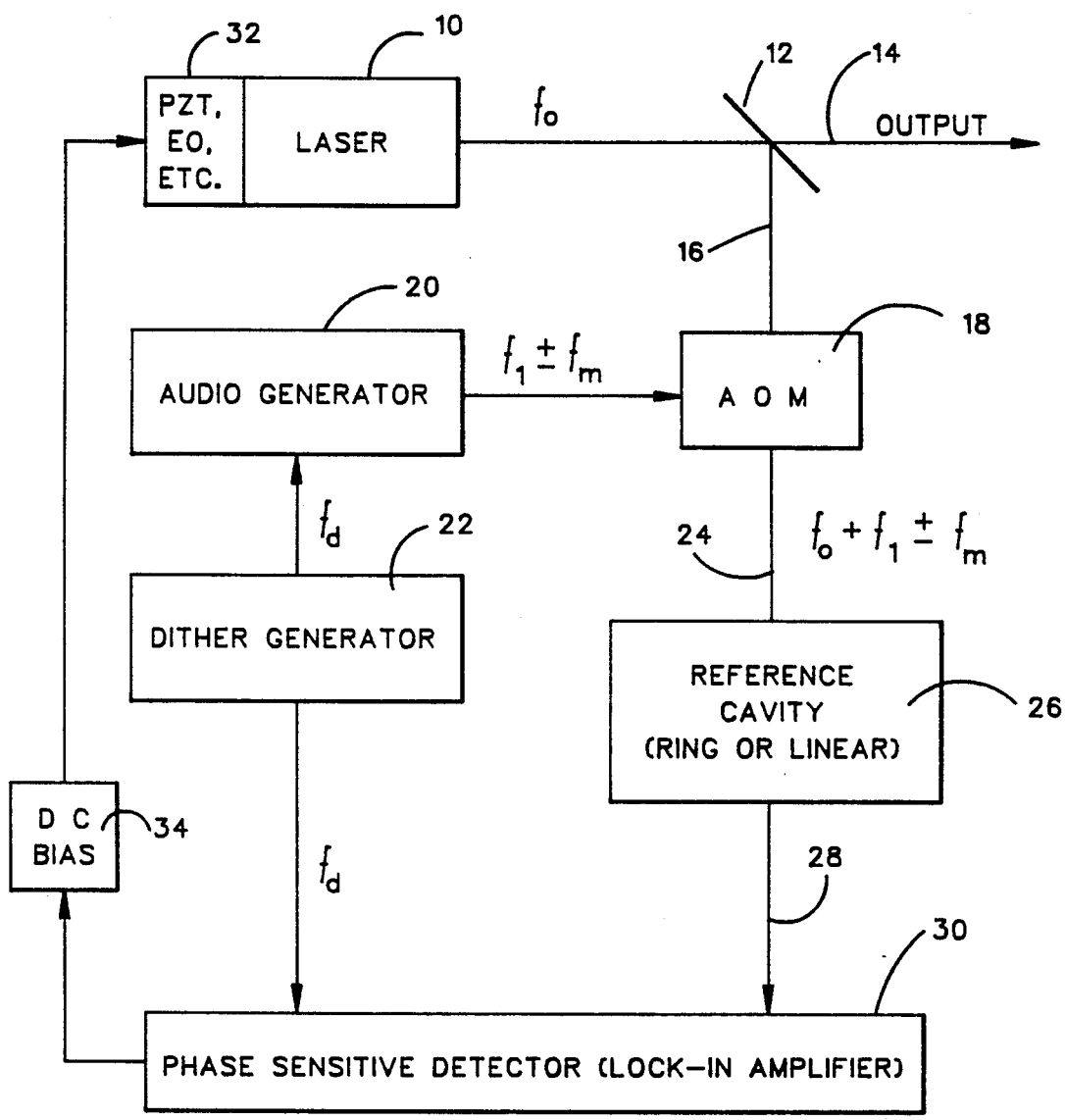
FIG. 1 shows a block diagram of the present invention.

A laser 10 emits light at a frequency $f_o$ which passes through a beam splitter 12, the majority of it emerging as an output 14. The remainder 16 enters an acousto-optical modulator (AOM) 18, which is driven by an audio generator 20. The audio generator ordinarily produces a base frequency $f_1$, but is itself driven by a dither generator 22, which alternately increases and decreases the frequency of the audio generator by a modulation frequency $f_m$. This alternate increase and decrease may be in the form of a square wave, triangular wave, sine wave, or any other convenient modulation. The audio generator 20 and dither generator 22 may comprise, for example, a voltage controlled oscillator (VCO) driven by a source of direct current upon which a small alternating current at a dither frequency $f_d$ has been superimposed, the amplitude of the alternating current thereby determining the frequency $f_m$.

By any such convenient means, the AOM 18 produces a frequency modulated audio signal which varies in frequency from $f_1 + f_m$ to $f_1 - f_m$ in a square, triangular, sine, or other convenient modulation. The beam 24 emerging from the AOM 18 therefore has a frequency varying from $f_o + f_l + f_m$ to $f_o + f_l - f_m$. The beam then enters a reference cavity 26, which may be either a ring (such as a ring cavity) or linear (such as a Fabry-Perot interferometer). The reference cavity 26 must be ultrastable. It therefore preferably is made of Zerodur, is temperature controlled, is isolated from shock, and is otherwise made as stable as possible. If necessary, the reference cavity 26 may itself be actively stabilized. If so, dithering should be done at a frequency sufficiently distinct from that of the laser 10, audio generator 20, or dither generator 22 as to minimize cross coupling.

The beam 28 emerging from the reference cavity 26 is measured by a phase sensitive detector (lock-in amplifier) 30, which also receives a signal indicative of the frequency being applied to the AOM 18. This is most conveniently provided directly from the dither generator 22, as shown in FIG. 1, but may be picked off from the audio generator 20 or AOM 18 if desired. Since the frequency of the light beam 24 is changing from $f_o + f_l + f_m$ to $f_o + f_l - f_m$ at a frequency $f_d$, the amplitude of the light beam 28 is modulated at the same frequency $f_d$. The resulting phase difference between this amplitude signal and the signal from the dither generator 22 can be detected and used to drive a PZT, EO, or similar frequency changing device 32 on the laser 10 so as to lock its frequency to that of the cavity 26.

A dc bias 34 is added to the signal from the phase sensitive detector 30 so that the laser 10 can be initialized to some frequency within the operating band width of the cavity 26. It is convenient for the dc bias 34 to be manually adjusted, but an automatic sweep through a sufficiently broad band of voltages (and consequent band of frequencies of the laser 10) may be provided if desired. Likewise, instead of tuning the laser 10 to the cavity 26, the resonant frequency of the cavity 26 may be initialized to some pre-selected frequency within the operating band width of the laser 10. This latter method will cause the problem that whatever tuning apparatus is used to initialize the cavity frequency will itself have to be stabilized, but this problem may be small, especially if the cavity 26 is actively stabilized.

It is to be noted that the frequency changing device 32 receives a signal proportional only to the phase difference between the optical signal 28 and the direct signal from the dither generator 22. This phase difference signal does not include within it any of the foregoing frequencies, $f_o$, $f_l$, $f_m$, or $f_d$. The emergent output 14 of the laser 10 is therefore ultrastable (as stable as the reference cavity 26), is not confined to the resonant frequency of any material, and does not include any dither, acoustical, or other contaminating frequency component.

INDUSTRIAL APPLICABILITY

The present invention is capable of exploitation in industry, and can be used, whenever it is desired to provide a laser with ultrastable frequency, avoiding both dither frequency contamination and the limitations imposed by the limited number of reference materials with resonant frequencies in the desired band. It can be made out of components which, taken separately and apart from one another, are entirely conventional, or it can be made from their nonconventional analogs.

While a particular embodiment of the present invention has been described above, a true scope and spirit of the present invention are not limited to this embodiment, but are limited only by the following claims.

What is claimed is:

1. A stabilized laser comprising:
   (a) a laser producing a first beam;

(b) a beam splitter splitting the first beam into a second, output beam and a third, sample beam;
(c) an acousto-optical modulator (AOM) modulating the third beam at a frequency which is, itself, frequency modulated, the AOM producing a fourth beam;
(d) a stabilized reference cavity receiving the fourth beam and emitting an amplitude modulated fifth beam;
(e) a phase sensitive detector producing a difference signal responsive to the phase difference between the frequency modulation of the AOM and the amplitude modulation of the fifth beam;
(f) means for changing the frequency of the laser, said frequency changing means being responsive to the difference signal produced by the phase sensitive detector such that the frequency of said laser is locked to a resonator frequency of said reference cavity.

2. The apparatus of claim 1 wherein the reference cavity is a ring cavity.

3. The apparatus of claim 1, wherein the reference cavity is linear.

4. A method for stabilizing the frequency of a first beam produced by a laser, comprising the steps of:
(a) splitting the first beam into a second, output beam and a third, sample beam;
(b) modulating the third beam with an acousto-optical modulator (AOM) at a frequency which is, itself, frequency modulated, the AOM producing a fourth beam;
(c) receiving the fourth beam into a stabilized reference cavity, the cavity emitting an amplitude modulated fifth beam;
(d) producing a difference signal responsive to the phase difference between the frequency modulation of the AOM and the amplitude modulation of the fifth beam;
(e) changing the frequency of the laser in response to the difference signal such that the frequency of said laser is locked to a resonator frequency of said reference cavity.

5. The method of claim 4 wherein the reference cavity is a ring cavity.

6. The method of claim 4, wherein the reference cavity is linear.

* * * * *